United States Patent [19]
Czipri

[11] Patent Number: 5,964,183
[45] Date of Patent: Oct. 12, 1999

[54] BIRD FEEDER

[76] Inventor: John Czipri, 344 E. Lake Rd., Palm Harbor, Fla. 34685

[21] Appl. No.: 09/290,917

[22] Filed: Apr. 12, 1999

[51] Int. Cl.$^6$ ..................................................... A01K 5/00
[52] U.S. Cl. .......................................................... 119/52.3
[58] Field of Search ................................... 119/52.1, 52.2, 119/52.3, 57.8, 57.9

[56] References Cited

U.S. PATENT DOCUMENTS

| | | |
|---|---|---|
| 2,230,058 | 1/1941 | Hornung . |
| 2,965,070 | 12/1960 | Myrick . |
| 3,124,103 | 3/1964 | Stainbrook ............................. 119/52.2 |
| 4,541,362 | 9/1985 | Dehls ..................................... 119/52.2 |
| 4,646,686 | 3/1987 | Furlani .................................. 119/52.2 |
| 5,048,461 | 9/1991 | Wessner ................................ 119/52.3 |
| 5,156,112 | 10/1992 | Brown . |
| 5,163,382 | 11/1992 | Morrison ............................... 119/57.9 |
| 5,195,459 | 3/1993 | Ancketill . |
| 5,195,460 | 3/1993 | Loken . |
| 5,207,181 | 5/1993 | Loken .................................... 119/57.9 |
| 5,255,631 | 10/1993 | Anderson .............................. 119/52.2 |
| 5,375,558 | 12/1994 | Drakes . |
| 5,720,238 | 2/1998 | Drakos ................................... 119/57.9 |

*Primary Examiner*—Thomas Price
*Attorney, Agent, or Firm*—Harold D. Shall

[57] ABSTRACT

A bird feeder having an inner feed containing tube with a removable top, fixed bottom and feed access openings therein, an outer tube shrouding the inner tube and having feed access openings therein and an upper and lower position. In the upper position the feed access openings in the inner and outer tubes are aligned and when the outer tube moves downwardly relative to the outer tube the access openings are closed. A lever is pivotally connected to the fixed bottom and operatively connected to the outer tube. A biasing element urges the lever to pivot in a direction to move the outer member to its upper position.

5 Claims, 3 Drawing Sheets

BIRD FEEDER

BACKGROUND OF THE INVENTION

1. Field of the Invention

This invention relates to bird feeders generally and more particularly to an improved feeder incorporating concealed and protection devices for preventing squirrels and large birds from utilizing the feeder.

2. Description of the Prior Art

Bird feeders which incorporate devices for preventing squirrels and large birds from obtaining access to the feed within the feeder are well known in the art. Patents such as U.S. Pat. Nos. 4,646,686; 5,375,558; 5,720,238, 5,163,382 and U.S. Pat. No. 5,195,459 disclose feeders having a feed containing chamber and a shroud encircling the chamber, which shroud is in a normally "open condition" at which time passageways through the shroud and the feed chamber are aligned confluently in an "open position" and a second or closed position wherein the weight of a squirrel on the feeder will move the shroud downwardly whereby the passageways are no longer aligned and the squirrel is unable to reach the feed. Biasing means in the form of springs or weights are utilized by these patents to maintain the shroud in the open position, until the squirrels weight overcomes the biasing means and the shroud moves to the closed position.

SUMMARY OF THE INVENTION

The present invention relating to a squirrel protected bird feeder includes an inner cylindrical tube with a closed bottom for containing bird feed and side openings for the birds to reach into the tube and obtain side bird feed. An outer shroud surrounds at least the lower end of the inner tube and has side openings which, in a first position, are confluent with the tube's side opening, and in a lower position are no longer confluent and block the openings. In a first embodiment a spring acting through a lever and fulcrum arrangement maintains the shroud upward in its "confluent" position until such time as the squirrel's weight on the shroud overcome the spring to move the tube downward to the non-confluent position. In a second embodiment, a weight acts through a lever and fulcrum arrangement to resist shroud movement to a non-confluent position. In both of these embodiments, the lever has a plurality of spaced openings so the effective lever length can be adjusted by repositioning the location of attachment of the spring or weight of the lever.

BRIEF DESCRIPTION OF THE DRAWINGS

FIG. 4 is a view like FIG. 2 of the embodiment of FIG. 3.

DETAILED DESCRIPTION OF THE PREFERRED EMBODIMENT

Figure 1:
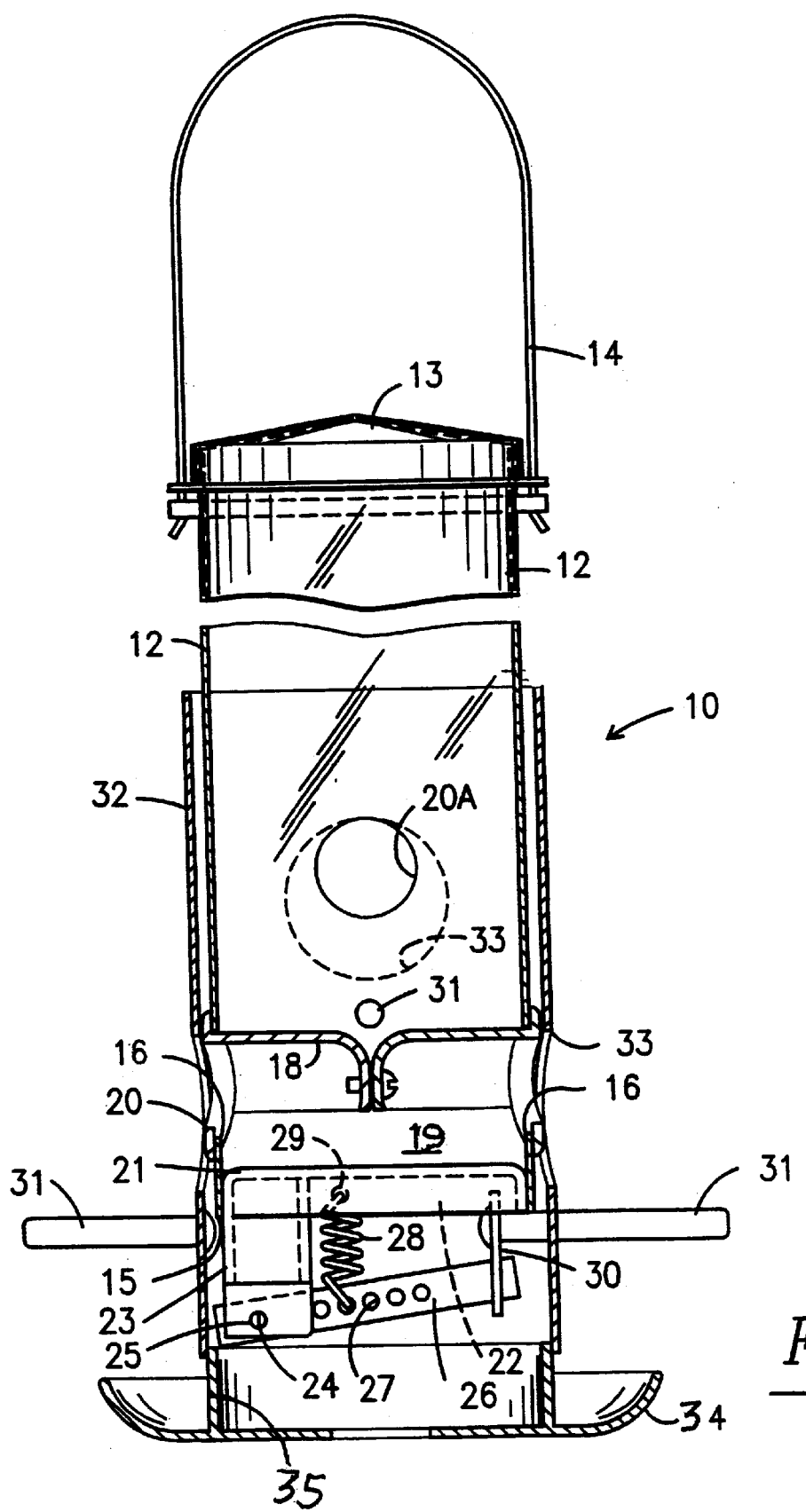
FIG. 1 is a front cross sectional view of a preferred embodiment of this invention with the shroud in the confluent position.

A squirrel protected bird feeder is shown generally at 10 and has a tubularly shaped inner tube 12, preferably made from a tough transparent material such as plexiglass. A cap 13 fits on and closes the upper end thereof and a conventional suspending clip 14 has its ends secured in openings in the tube 12 in a conventional manner. Just above the lower end 15 of the tube 12 are a pair of diametrically opposed openings 16 which opening 16 extends completely through the tube 12 and a structurally strong and ware resistant flanged cylindrical and hollow insert 18 is secured in the openings 16. The insert made of a fiberglass filled nylon 18 has a pair of opposed openings 19 through the same in the lower surface thereof so that a bird can reach seeds through an opening 20 in the flanged two piece cylindrical and hollow insert 18 and through the opening 19 into the tube 12. A bottom cap 21 is fixedly secured in a sealing relationship in the bottom of the tube 12 and a has a down turned flange 22 extending downwardly there from.

A rigid mounting boss 23 extends downwardly from the flange 22 and has a cordially extending opening 24 near the bottom thereof. The opening 24 mounts a pivot pin 25 therein which acts as a fulcrum for the opening adjacent the left end of a pivot arm in the form of a lever 26.

The medial portion of the lever 26 has a series of openings 27 therein in to a selected one of which is secured the lower end of a coiled tension springs 28. The top end of the spring 28 is secured in the opening 29 in the flange 22 of the end cap 21, whereby the lever 26 is biased to move counter-clockwise about fulcrum pin 25. The right end of the pivot arm 26 is operatively and pivotally connected to a bracket 30 as by being received in a vertically elongated slot in the lower end of the bracket 30, which slot is disposed below a perch member 31; and which inner end of the perch member is fixedly secured to the upper portion adjacent the top of the bracket 30. The outer end of the perch 31 and also the other perches 31A, extends through and is secured in an opening in a moveable shroud 32.

The shroud 32 is made of a material which is resistant to the gnawing of a squirrel, such as steel, is tubular in shape, is slightly greater in internal diameter than the outer diameter of the inner tube 12 and is disposed in telescopic relationship with the inner tube 12. With the feeder in the feeding position of FIG. 1, the top of the shroud 32 is disposed above the top feeding opening 20A, while the bottom of the shroud ends below the bottom of the boss 23 and the lever 26. The shroud 32 has feeding openings 33 therein, which in the feeding condition of FIG. 1, allows access therethrough to the openings 20 and 20A and through the latter to the feed contents of the feeder 10. A cup shaped bottom cap 34 covers the bottom of the feeder 12 and has a upturned annular flange 35 extending into the bottom of the shroud 32 in a pressed fit relationship. When a squirrel rests upon a perch 31, the weight of the squirrel is imposed, by means of the perch and the attached shroud, on the right end of lever 26 and the perch and the shroud move downwardly to the position of FIG. 2 wherein the shroud covers the openings 20 and 20A, thereby preventing the squirrel from obtaining access to the contents of the feeder.

Figure 2:
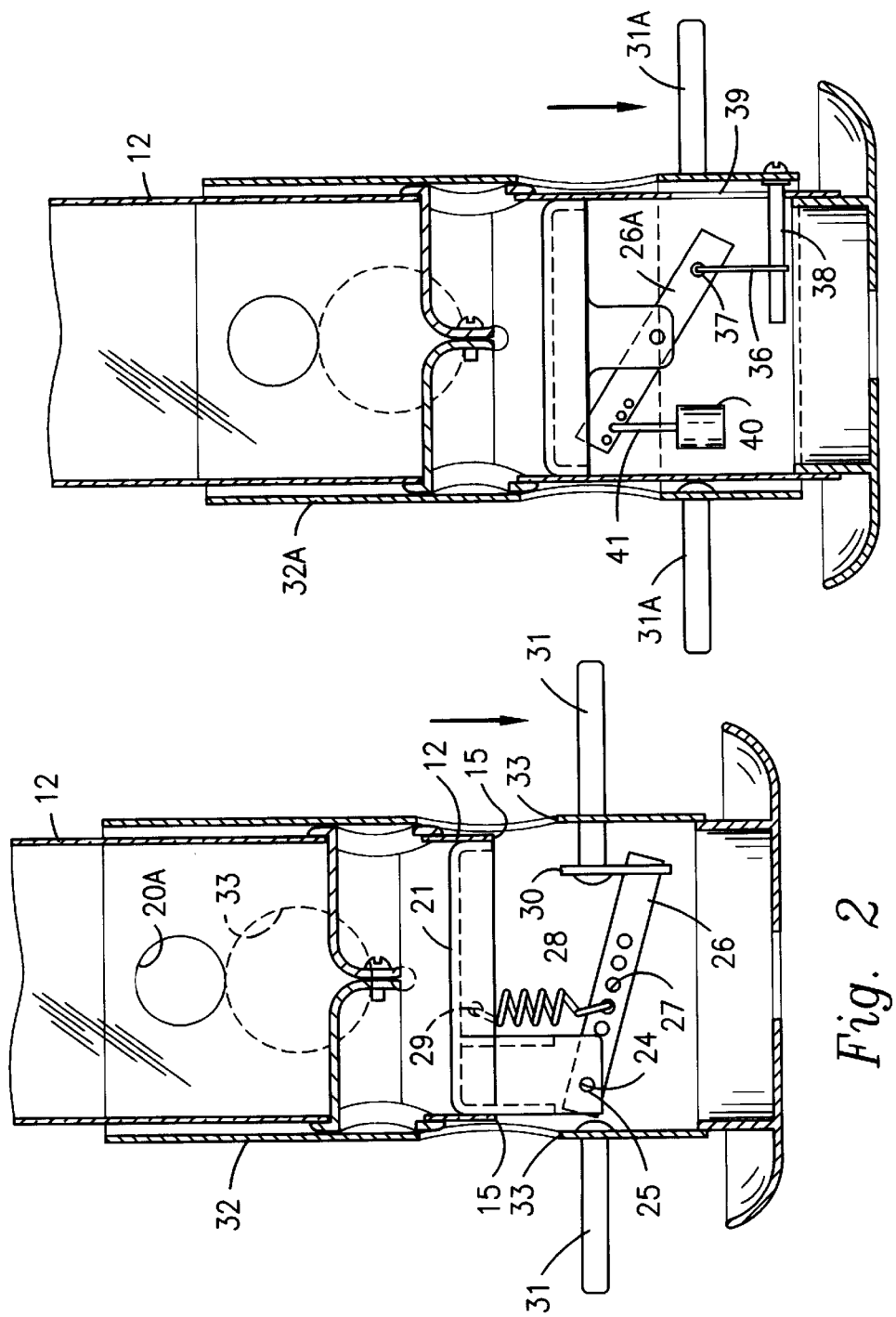
FIG. 2 is a view like FIG. 1 with the shroud in its downward or non-confluent position.

Since some areas of the U.S. have small squirrels, while other areas have larger squirrels, the position of the springs engagement with the openings 27 in the lever 26 can be selected, so that the weight of the squirrel will overcome the biasing force of the spring 28 and thereby move the shroud from its position in FIG. 1 to its position in FIG. 2. Immediately upon the squirrel leaving the feeder 12, the spring 28 will bias the lever 26 upwardly and along therewith the shroud 32 to the "feed access" or confluent position.

Figure 3:
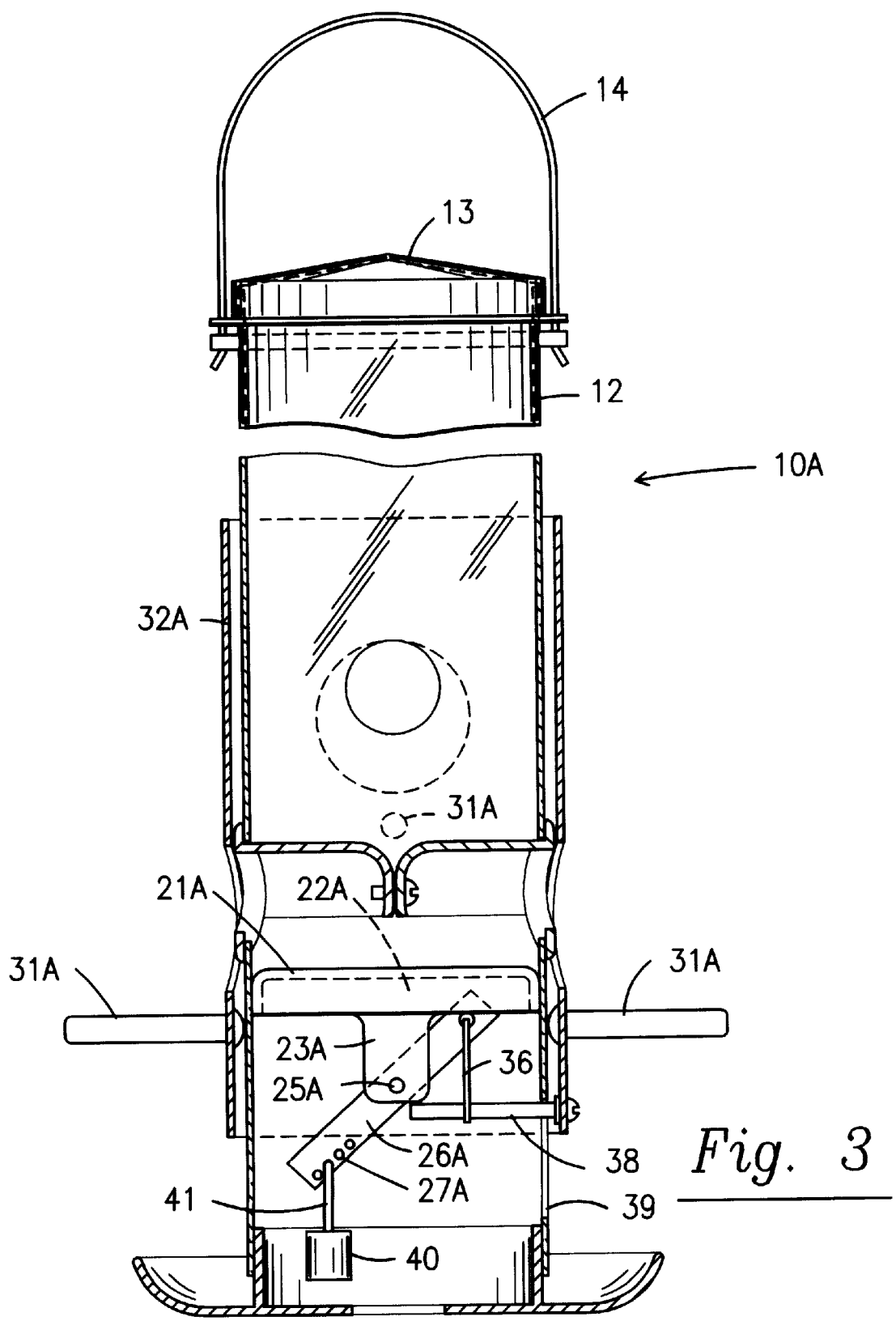
FIG. 3 is a view like FIG. 1 of another embodiment of this invention.

Referring now to FIGS. 3 and 4 wherein like parts have the same numerals, a second embodiment of the feeder 10A has an inner tube 12,and an outer tube or shroud 32A. The difference between this second embodiment 10A and the embodiment 10 is the biasing means for holding the shroud in its upward confluent or feed access position while allowing the weight of a squirrel to move it to is down position or non access position. The bottom cap 21A has an annular downward flange 22A and a boss 23A depending therefrom. A lever 26A is pivotally mounted at a point intermediate its ends on a pivot pin 25A carried in the lower end of the boss 23A. The right end of the lever 26A has a link rod 36 secured thereto as by the top of the rod 36 being pivotally received in an opening 37 in the right end of the rod, while the rod extends downwardly and the lower end thereof is received about a pin 38. The pin 38 extends outwardly through an axially elongated slot 39 in the lower end of inner tube 12 and its outer end is fixedly secured in the shroud 32A adjacent the lower end of the shroud.

The lever 26A has a series of openings 27A therein adjacent the left end thereof and a weight 40 has a hook portion 41 which is removably placed into a selected one of the openings 27A. When a squirrel gets on a perch 31A, the weight thereof acts upon the weight 40 forcing the lever 26A to move clockwise against the biasing effect of the weight 40 and the lever 26A moves clockwise to allow the shroud to move down to is non-access position.

The weight 40 can be secured in the desired one of the series of openings 27A to adjust for the expected weight of the squirrel involved. Upon the squirrel vacating the perch 31A, the weight 40 moves the lever 26A counter clockwise and thereby moves the shroud 32A to its feed access position.

Although the above description relates to a presently preferred embodiments, numerous changes can be made therein without departing from the scope of this invention as claimed in the following claims.

What is claimed is:

1. A bird feeder comprising in combination,
   A) an inner tubular member for containing feed including,
      1) a transparent tubular structure,
      2) a removable end cap for the top of said tubular structure,
      3) a fixed end cap fixedly secured to the bottom of said tubular structure,
      4) a plurality of feed access openings in said tubular structure,
      5) supporting means carried by the top of the tubular structure whereby said bird feed may be hung from an object,
   B) an outer tubular member having a diameter slightly larger than said inner tubular member and disposed in a vertically moveable telescopic surrounding relationship therewith and having an upper feed access position and a lower position wherein said access is terminated including,
      1) a plurality of feed access openings in said outer tubular member positioned confluently with said feed access openings when said outer tubular member is in its upper position,
      2) a perch disposed below and adjacent each of said feed access openings in said outer member,
      3) said outer tubular member having an open top which, when outer tubular members is in its upper position, terminates below the top of the inner tubular member, and having a bottom which extends below said fixed end cap, and
   C) biasing means for biasing said outer tubular member upwardly relative to said lower tubular member whereby the feed access openings therein are in confluent relationship, including
      1) lever means pivotally mounted relative to said fixed end cap, one end of said lever means being operatively pivotally connected to said outer member, and operative to urge said outer member to its feed access position, and biasing means acting upon said lever means for biasing said lever means in a direction to urge said outer member to its feed access position.
   D) said bottom of said outer tubular member extending below said biasing means and said lever means.

2. A bird feeder according to claim 1 wherein said fixed end cap has a downwardly extending boss thereon, said lever means is pivotally mounted to said boss at one end thereof and operatively connected said outer tubular member at its other end and a spring acts between said lever means and said fixed end cap to bias said outer member toward its feed access position.

3. A feeder according to claim 2 wherein said lever means has a plurality of spaced opening intermediate the ends thereof, each of said openings being selectively operative to secure an end of said spring to said lever.

4. A feeder according to claim 1 wherein said fixed end cap has a downwardly extending boss therein, said lever means is pivotally mounted relative thereto with the mounting being at a point on said lever intermediate its ends, and being pivotally connected at one of its ends to said outer member and said lever having an end opposite to said pivotal connection and a depending weight is secured to said opposite end.

5. A feeder according to claim 4 wherein said opposite end of said lever has a plurality of spaced openings therein, said weight has a hook means therein and said hook means engages in a select one of said spaced openings.

* * * * *